United States Patent
Kasahara et al.

(10) Patent No.: US 8,687,220 B2
(45) Date of Patent: Apr. 1, 2014

(54) IMAGE FORMING APPARATUS, INFORMATION PROCESSING DEVICE, AND NON-TRANSITORY COMPUTER READABLE MEDIUM STORING PROGRAM

(75) Inventors: Shunsuke Kasahara, Kanagawa (JP); Masayoshi Kikuta, Kanagawa (JP); Masafumi Ono, Kanagawa (JP); Kei Hatano, Kanagawa (JP); Yoshifumi Bando, Kanagawa (JP); Terutake Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 68 days.

(21) Appl. No.: 13/599,456

(22) Filed: Aug. 30, 2012

(65) Prior Publication Data
US 2013/0242341 A1   Sep. 19, 2013

(30) Foreign Application Priority Data
Mar. 14, 2012   (JP) .................................. 2012-057752

(51) Int. Cl.
| | |
|---|---|
| G06F 15/00 | (2006.01) |
| G06F 3/12 | (2006.01) |
| G06K 1/00 | (2006.01) |
| G06K 15/02 | (2006.01) |
| G06K 15/00 | (2006.01) |
| H04N 1/00 | (2006.01) |

(52) U.S. Cl.
CPC ............ *G06K 15/02* (2013.01); *G06K 15/4055* (2013.01); *H04N 1/00891* (2013.01); *G06F 3/1221* (2013.01)
USPC ........................................ 358/1.15; 358/1.13

(58) Field of Classification Search
CPC ... G06K 15/02; G06K 15/4055; G06F 3/1221
See application file for complete search history.

(56) References Cited

U.S. PATENT DOCUMENTS

| | | | |
|---|---|---|---|
| 2011/0228327 A1* | 9/2011 | Maeda | 358/1.15 |
| 2012/0059606 A1* | 3/2012 | Ikari | 702/61 |

FOREIGN PATENT DOCUMENTS

JP   A-2007-038580   2/2007

* cited by examiner

*Primary Examiner* — Douglas Tran
(74) *Attorney, Agent, or Firm* — Oliff PLC

(57) ABSTRACT

An image forming apparatus having an operation mode, an energy saving mode, and a stop mode includes an image forming unit that forms an image on a recording member, and a control unit that controls the image forming unit, wherein the control unit includes an arithmetic unit that performs a logical operation or a numerical operation, a storage unit that stores a register value used by the arithmetic unit in a non-volatile register which is readable and writable, and retains stored information even when no power is supplied, and a change unit that changes the register value stored in the non-volatile register so as to correspond to a mode change between the operation mode and the energy saving mode or between the operation mode and the stop mode.

18 Claims, 12 Drawing Sheets

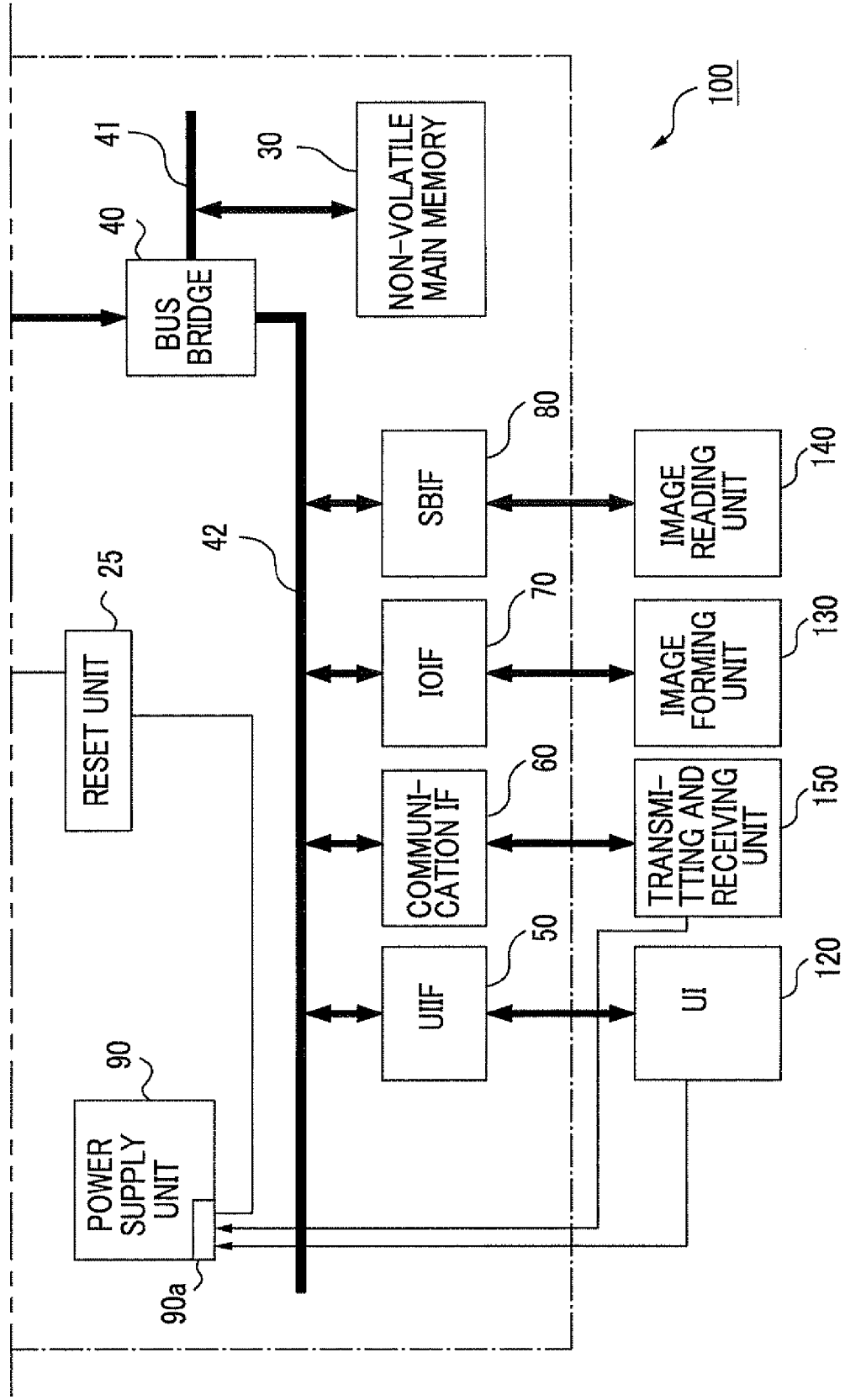

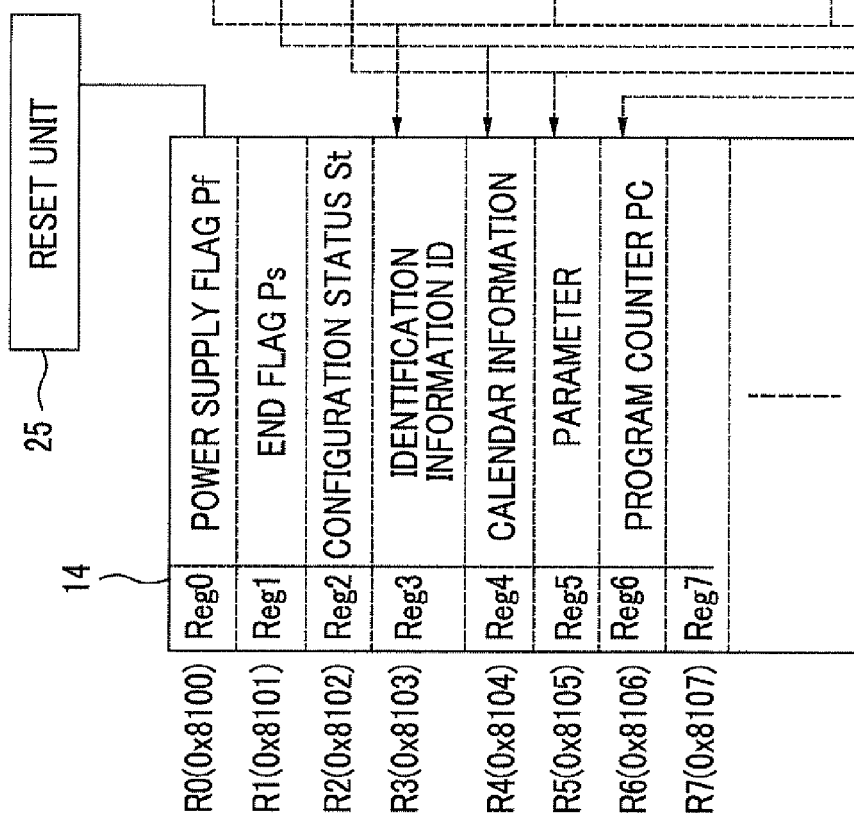

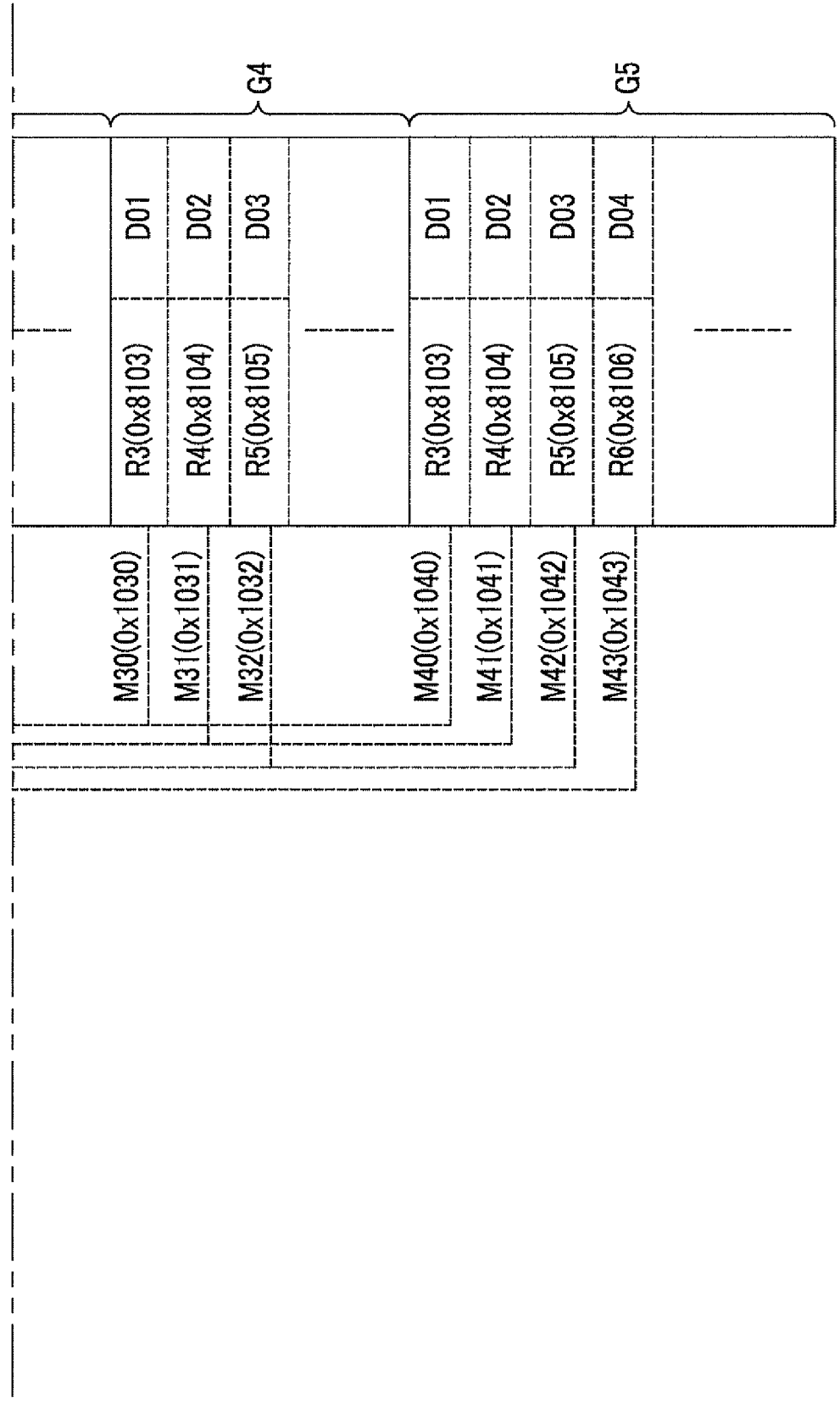

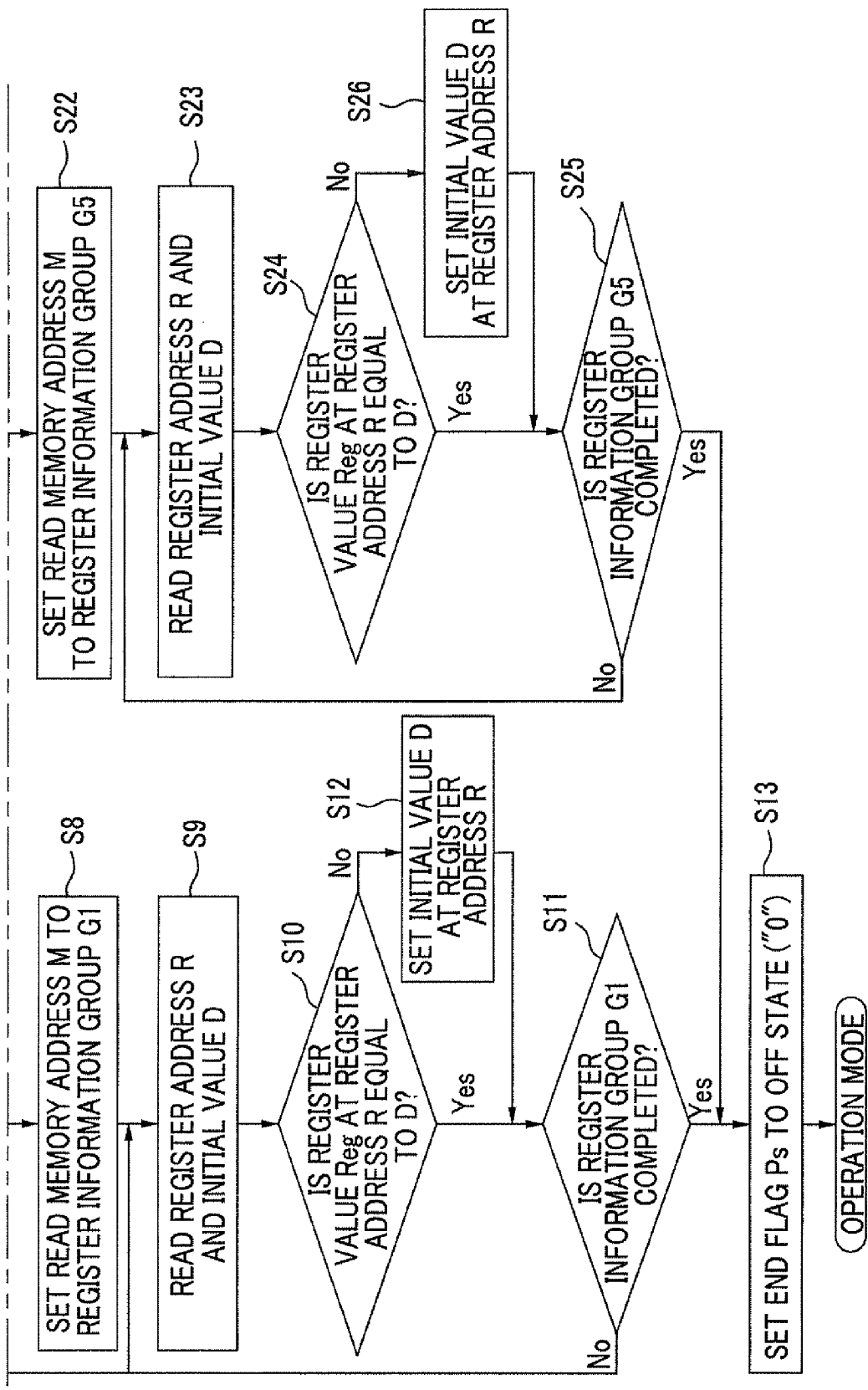

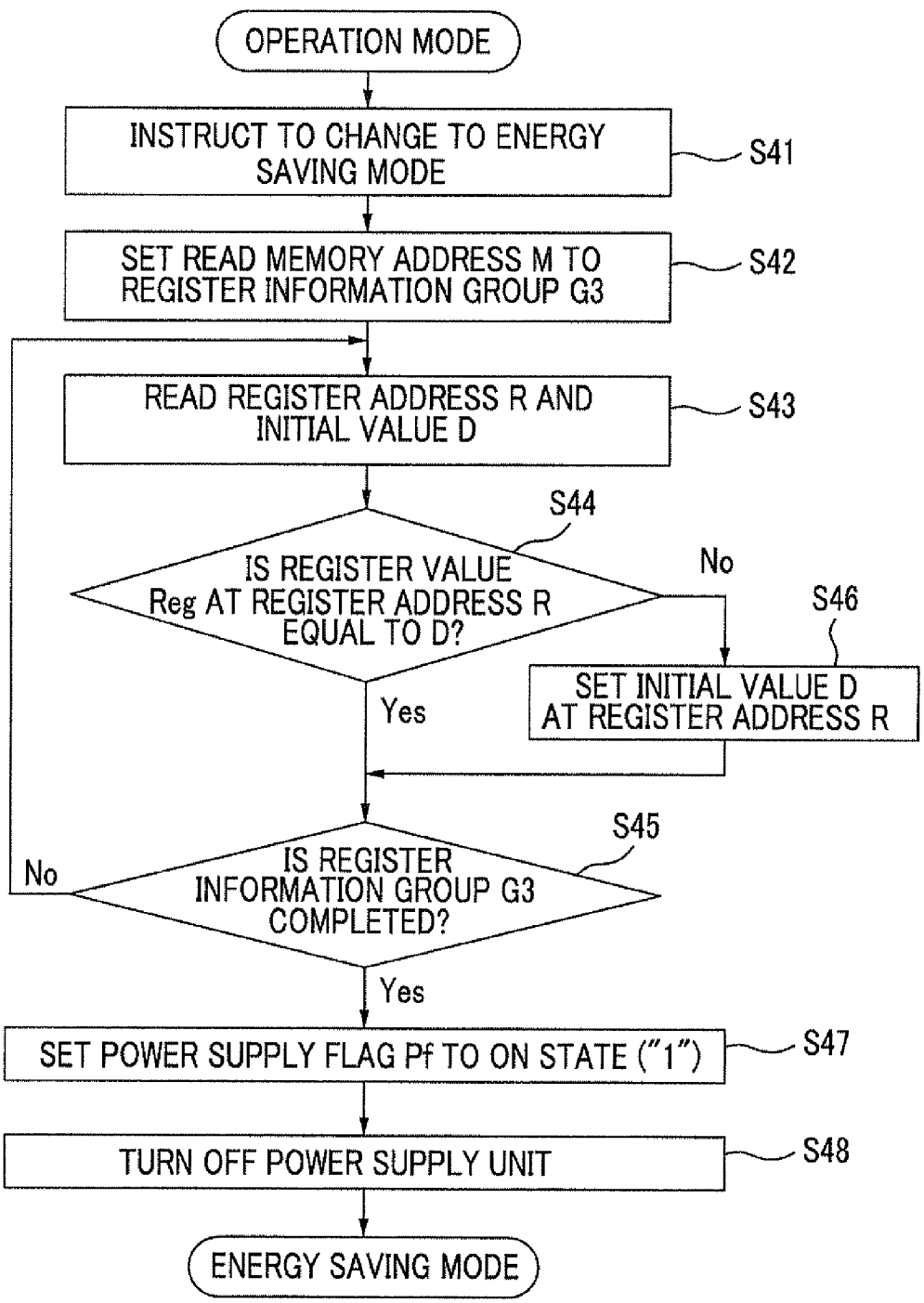

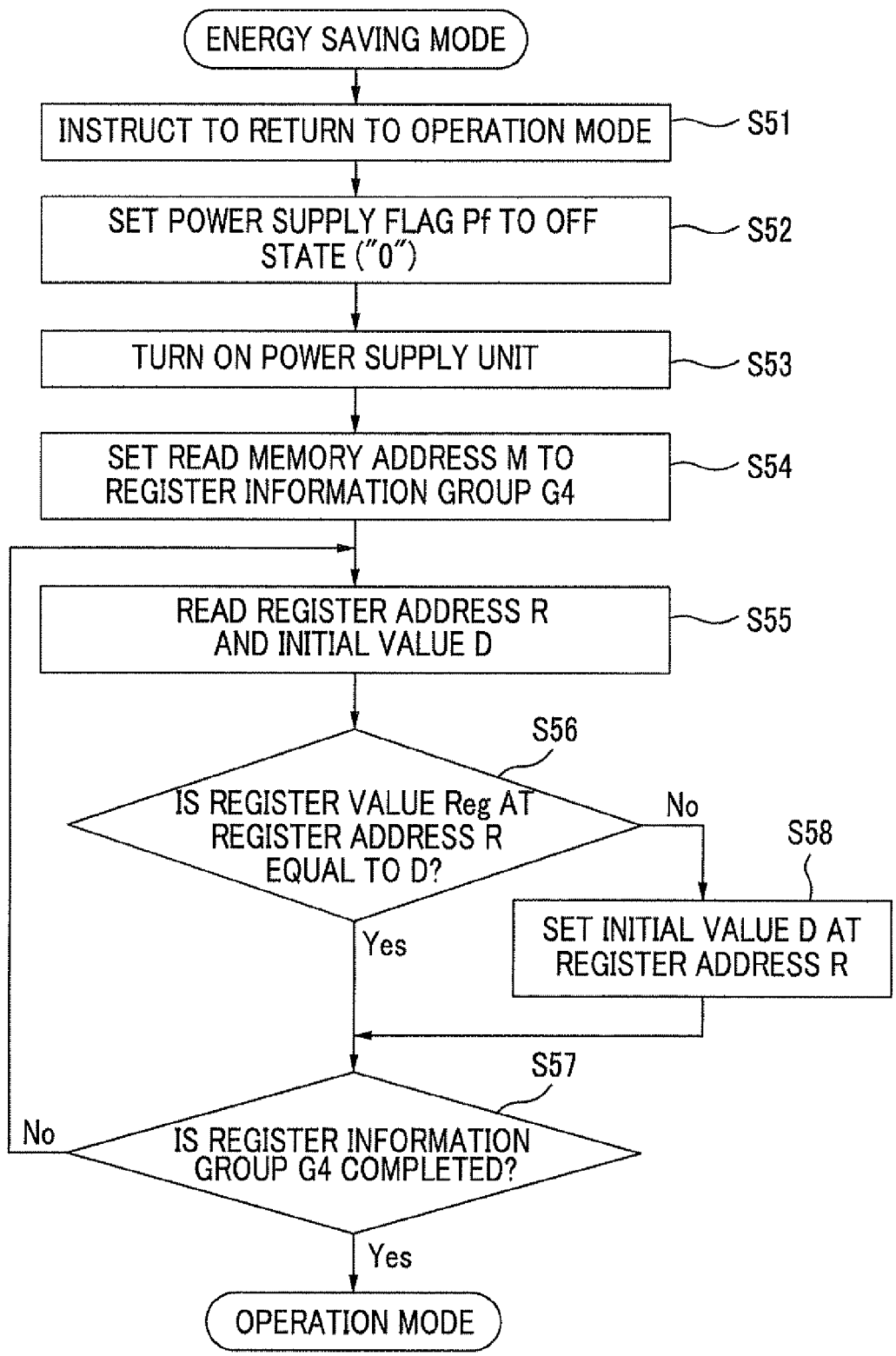

IMAGE FORMING APPARATUS, INFORMATION PROCESSING DEVICE, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2012-057752 filed Mar. 14, 2012.

BACKGROUND

Technical Field

The present invention relates to an image forming apparatus, an information processing device, and a non-transitory computer readable medium storing a program.

SUMMARY

According to an aspect of the invention, there is provided an image forming apparatus having an operation mode in which the image forming apparatus is supplied with power and operates, an energy saving mode in which power consumption is less than that in the operation mode, and a stop mode in which no power is supplied, including: an image forming unit that forms an image on a recording member; and a control unit that controls the image forming unit, wherein the control unit includes: an arithmetic unit that performs a logical operation or a numerical operation; a storage unit that stores a register value used by the arithmetic unit in a non-volatile register which is readable and writable, and retains stored information even when no power is supplied; and a change unit that changes the register value stored in the non-volatile register so as to correspond to a mode change between the operation mode and the energy saving mode or between the operation mode and the stop mode.

BRIEF DESCRIPTION OF THE DRAWINGS

Exemplary embodiments of the present invention will be described in detail based on the following figures, wherein:

FIGS. 3A and 3B are diagrams illustrating a non-volatile register and a portion of a non-volatile main memory;

FIG. 7 is a flowchart illustrating a mode change from the operation mode to the energy saving mode; and FIG. 8 is a flowchart illustrating a mode change from the energy saving mode to the operation mode.

DETAILED DESCRIPTION

Hereinafter, an exemplary embodiment of the invention will be described in detail with reference to the accompanying drawings.

Image Forming System

Figure 1:
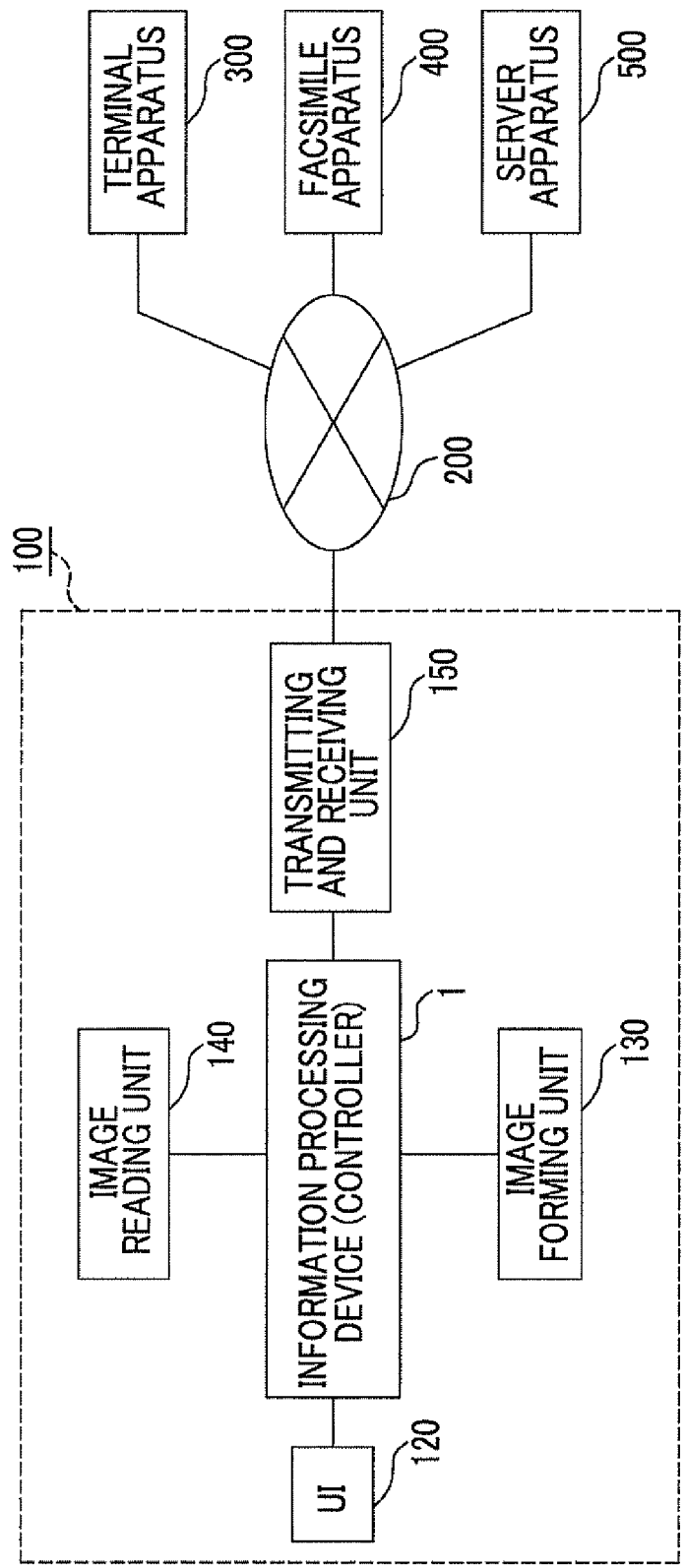
FIG. 1 is a diagram illustrating an example of the structure of an image forming system according to an exemplary embodiment.

FIG. 1 is a diagram illustrating the structure of an image forming system according to this exemplary embodiment.

The image forming system includes an image forming apparatus 100 serving as a so-called multi-function machine having a scanning function, a print function, a copy function, and a facsimile function, a communication line 200 connected to the image forming apparatus 100, a terminal apparatus 300 connected to the communication line 200, a facsimile apparatus 400 connected to the communication line 200, and a server apparatus 500 connected to the communication line 200.

The communication line 200 is, for example, an Internet line or a telephone line. The terminal apparatus 300 instructs the image forming apparatus 100 to form an image through the communication line 200 and is, for example, a PC (Personal Computer). The facsimile apparatus 400 transmits and receives a facsimile to and from the image forming apparatus 100 through the communication line 200. The server apparatus 500 transmits and receives data (including a program) to and from the image forming apparatus 100 through the communication line 200.

In addition, the image forming apparatus 100 includes an image reading unit 140 that reads an image recorded on a recording medium, such as paper, an image forming unit 130 that forms an image on a recording medium, such as paper, a user interface (UI) 120 that receives instructions related to a power on/off operation and operations using a scanning function, a print function, a copy function, and a facsimile function from the user and displays a message to the user, a transmitting and receiving unit 150 that transmits and receives data to and from the terminal apparatus 300, the facsimile apparatus 400, and the server apparatus 500 through the communication line 200, and an information processing unit 1 serving as a controller that controls the operations of the image reading unit 140, the image forming unit 130, the UI 120, and the transmitting and receiving unit 150. In the image forming apparatus 100, the scanning function is implemented by the image reading unit 140, the print function is implemented by the image forming unit 130, the copy function is implemented by the image reading unit 140 and the image forming unit 130, and the facsimile function is implemented by the image reading unit 140, the image forming unit 130, and the transmitting and receiving unit 150. In addition, for example, the transmitting and receiving units 150 for the Internet line and the telephone line may be separately provided.

In the image forming apparatus 100, the image read by the image reading unit 140 is printed on a recording member, such as paper, by the image forming unit 130.

The image forming unit 130 may be a type in which a latent image is written onto a photoconductor drum with, for example, a laser beam and an LED, is developed with toner, and is then transferred onto a recording material or an ink-jet type in which ink is discharged to form an image on a recording material. The image reading unit 140 may be a type in which a light receiving element array is scanned or a type in which an imaging element, such as a CCD, is used to read an image.

The image forming apparatus 100 prints data for, for example, the image transmitted from the terminal apparatus 300, the facsimile apparatus 400, or the server apparatus 500 which is arranged outside the image forming apparatus 100 through the communication line 200 on the recording member using the image forming unit 130.

The image forming apparatus 100 transmits data for, for example, the image read by the image reading unit 140 from the transmitting and receiving unit 150 to the terminal apparatus 300 and/or the facsimile apparatus 400 arranged outside the image forming apparatus 100 through the communication line 200.

Image Forming Apparatus 100

Figure 2:
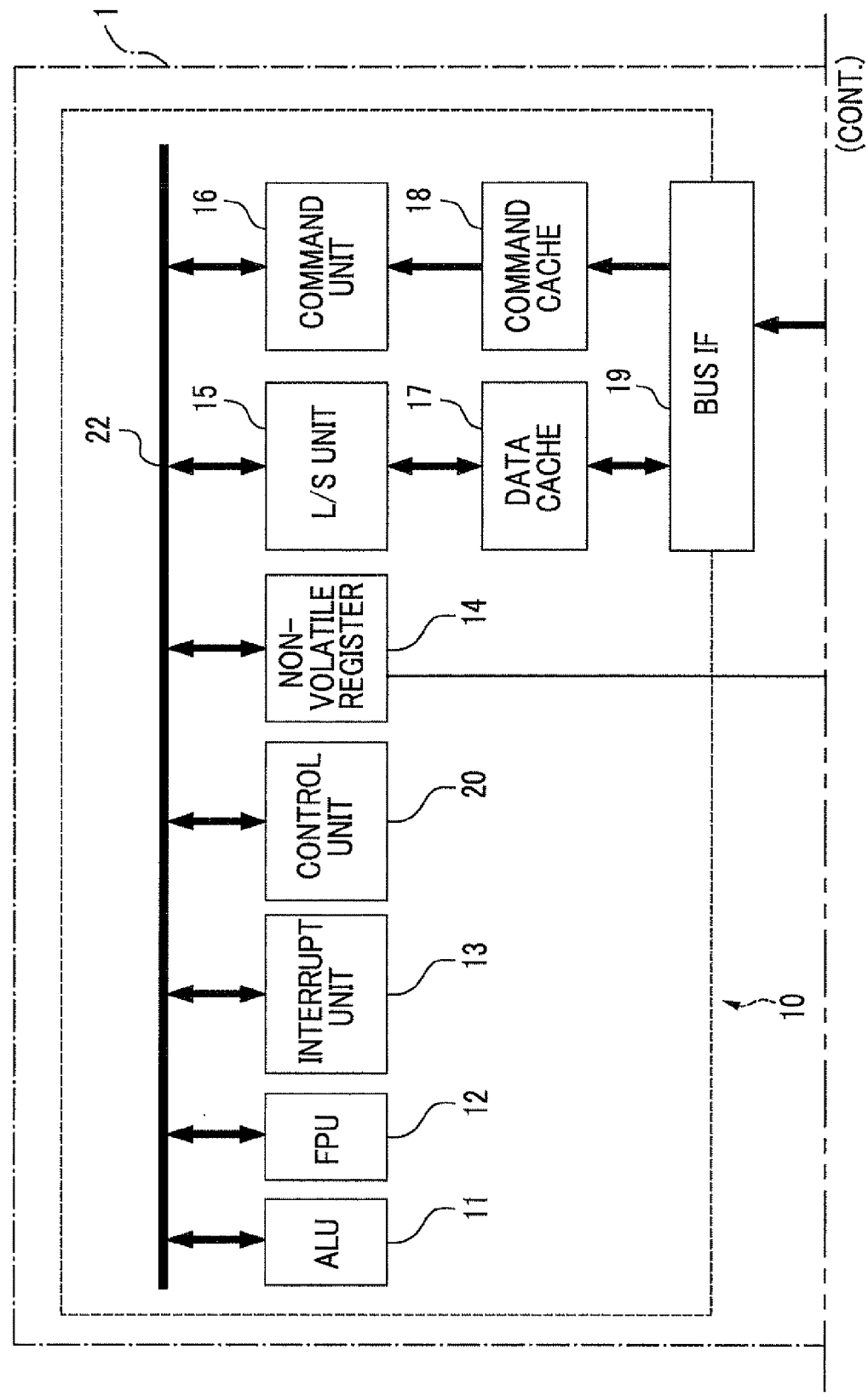
FIG. 2 is a diagram illustrating an example of the structure of an image forming apparatus.

FIG. 2 is a diagram illustrating an example of the structure of the image forming apparatus 100.

As shown in FIG. 1, the image forming apparatus 100 includes the information processing device 1 serving as a controller, the UI 120, the image forming unit 130, the image reading unit 140, and the transmitting and receiving unit 150.

The UI 120, the image forming unit 130, the image reading unit 140, and the transmitting and receiving unit 150 are each referred to as a structure of the image forming apparatus 100 and are all referred to as an apparatus configuration.

The information processing device 1 serving as a controller includes a central processing unit (hereinafter, referred to as a CPU) 10, a reset unit 25 that resets a specific bit of a non-volatile register 14, which is a readable and writable non-volatile memory element, a non-volatile main memory 30 that is a readable and writable non-volatile memory element, a bus bridge 40 that is connected to a data/address bus 41 and an external bus 42, which will be described below, a UIIF (user input interface) 50 that receives, for example, signals for controlling the information processing device 1 from the user, a communication IF (communication interface) 60 that is connected to a communication line, such as the Internet or a telephone network, an IOIF (input/output interface) 70 that is connected to an external apparatus, an SBIF (serial bus interface) 80 that performs serial communication, and a power supply unit 90.

In addition, the information processing device 1 includes the data/address bus 41 and the external bus 42.

The UI 120 is connected to the UIIF 50 of the information processing device 1, the image forming unit 130 is connected to the IOIF 70 of the information processing device 1, the image reading unit 140 is connected to the SBIF 80, and the transmitting and receiving unit 150 is connected to the communication IF 60.

The non-volatile memory element means an element with a function (storage function) of storing information ("1"/"0"). The term "volatile" means a state in which a function (storage function) of retaining the information ("1"/"0") is available when power is supplied, but the function (storage function) of retaining the information ("1"/"0") is unavailable, that is, it is difficult to retain the information when no power is supplied. In contrast, the term "non-volatile" means a state in which the function (storage function) of retaining the information ("1"/"0") is available even when no power is supplied, in addition to when power is supplied.

In this exemplary embodiment, the information processing device 1 includes a non-volatile main memory 30, but does not include a volatile main memory. The information processing device 1 may include the volatile main memory. In some cases, the non-volatile main memory 30 is referred to as a non-volatile memory.

The non-volatile main memory 30 includes, for example, an operating system (hereinafter, referred to as an OS), an application program (hereinafter, referred to as a program), text, constants, and variables. In addition, the non-volatile main memory 30 is used as a work area that temporarily stores, for example, data. In some cases, the OS is not needed.

The CPU 10 designates the address of the non-volatile main memory 30 and may directly read and write (access) the information ("1"/"0") from and to the area of the non-volatile main memory 30 designated by the address.

Next, the structure of the CPU 10 will be described.

The CPU 10 includes an ALU (Arithmetic Logical Unit) 11 which is an example of an arithmetic unit and performs a logical operation and a numerical operation, an FPU (Floating Point Unit) 12 which is an example of an arithmetic unit and performs a floating point operation, and an interrupt unit 13 which performs an interrupt process. In addition, the CPU 10 includes the non-volatile register 14 which retains (stores) data and addresses when these operations and processes are performed. In this exemplary embodiment, for example, the data and addresses stored by the non-volatile register 14 are referred to as register values.

In this exemplary embodiment, the CPU 10 includes the non-volatile register 14, but does not include a volatile register. The CPU 10 may include the volatile register.

The CPU 10 further includes an L/S unit (load/storage unit) 15 that controls the reading (loading) and retention (storage) of data and a command unit 16 that decodes commands.

In addition, the CPU 10 includes a data cache 17 that caches data, a command cache 18 that caches commands, and a bus IF (bus interface) 19 connected to the bus bridge 40.

The CPU 10 includes a control unit 20 that controls the ALU 11, the FPU 12, the interrupt unit 13, the non-volatile register 14, the L/S unit 15, the command unit 16, the data cache 17, the command cache 18, and the bus IF 19. The control unit 20 is an example of a change unit. The reset unit 25 is an example of another change unit.

In addition, the CPU 10 includes an internal bus 22 that is connected to the ALU 11, the FPU 12, the interrupt unit 13, the non-volatile register 14, the L/S unit 15, the command unit 16, and the control unit 20 and performs the input and output of data or commands therebetween.

It is assumed that the ALU 11, the FPU 12, the interrupt unit 13, the non-volatile register 14, the L/S unit 15, the command unit 16, the data cache 17, the command cache 18, the bus IF 19, the control unit 20, and the internal bus 22 forming the CPU 10 are formed as one semiconductor chip made of, for example, silicon. In addition, any one or some of the units maybe formed as another semiconductor chip and may be arranged outside the CPU 10.

In the CPU 10 according to this exemplary embodiment, for example, the data cache 17 and the command cache 18 have a storage function of retaining the information ("1"/"0") when power is supplied, but it is difficult for the data cache 17 and the command cache 18 to retain the ("1"/"0") when no power is supplied. The ALU 11 and the FPU 12 have an arithmetic register provided therein and have a storage function of retaining the information ("1"/"0") when power is supplied. When no power is supplied, the storage function is unavailable and it is difficult for the ALU 11 and the FPU 12 to retain the information. For example, the interrupt unit 13, the command unit 16, the bus IF 19, and the control unit 20 each have a register provided therein and have a storage function of retaining the information ("1"/"0") when power is supplied. When no power is supplied, the storage function is unavailable and it is difficult for the interrupt unit 13, the command unit 16, the bus IF 19, and the control unit 20 to retain the information. This holds for the bus bridge 40, the UIIF 50, the communication IF 60, the IOIF 70, and the SBIF 80.

Next, a connection relationship in the information processing device 1 will be described.

The bus IF 19 of the CPU 10 is connected to the bus bridge 40 such that, for example, data, addresses, and commands may be bidirectionally transmitted and received.

The data/address bus 41 and the external bus 42 are connected to the bus bridge 40. The non-volatile main memory 30 is connected to the data/address bus 41.

The data/address bus 41 includes an address bus and a data bus.

The address bus is a signal line that is used by the CPU 10 to transmit a signal for designating (accessing) the address of the non-volatile main memory 30. For example, when access is performed with a 32-bit width, the address bus includes 32 signal lines.

The data bus is a signal line through which data or a command is transmitted as a signal in order to read data or a command from the area of the non-volatile main memory 30 designated by the address. In addition, the data bus is a signal line through which data is transmitted as a signal in order to write data to the area of the non-volatile main memory 30 designated by the address. That is, when the address of the non-volatile main memory 30 is designated, data or a command may be read from the non-volatile main memory 30 and data may be written to the non-volatile main memory 30.

For example, when data or a command is transmitted and received with the 32-bit width, the data bus includes 32 signal lines.

As such, the non-volatile main memory 30 is arranged in a space (address space) which the CPU 10 can access (for example, a 4G space when the address (address) is 32 bits) and data or a command with a predetermined bit width (for example, 4 bytes when the bit width is 32 bits) is transmitted and received in bit parallel from the area of the non-volatile main memory 30 designated by the address.

In this exemplary embodiment, the data/address bus 41 is divided into the data bus and the address bus. However, the data/address bus 41 may be configured such that a portion of or the entire data bus and a portion of or the entire address bus are used in common.

The UIIF 50, the communication IF 60, the IOIF 70, and the SBIF 80 are connected to the external bus 42 such that, for example, data or commands may be transmitted and received therebetween.

Similarly to the data/address bus 41, the external bus 42 includes signal lines corresponding to the bit width for transmitting and receiving, for example, data or commands.

The power supply unit 90 is connected to the CPU 10, the reset unit 25, the bus bridge 40, the UIIF 50, the communication IF 60, the IOIF 70, and the SBIF 80 and supplies power thereto. In FIG. 1, lines through which power is supplied from the power supply unit 90 are not shown.

In addition, the power supply unit 90 includes a feed control unit 90a that is turned on in the energy saving mode, which will be described below. The feed control unit 90a is connected to the UI 120 and the transmitting and receiving unit 150 so as to receive signals from the UI 120 or the transmitting and receiving unit 150. In addition, the feed control unit 90a is connected so as to supply power to the reset unit 25 when it is turned on.

In this exemplary embodiment, the power supply unit 90 includes the feed control unit 90a. However, in the following description, in order to separately describe the feed control unit 90a, the power supply unit 90 does not include the feed control unit 90a. In addition, it is assumed that, when a power switch is turned on, first, the feed control unit 90a is turned on and the power supply unit 90 except for the feed control unit 90a is turned on.

Next, the internal connection relationship of the CPU 10 will be described.

The ALU 11, the FPU 12, the interrupt unit 13, the non-volatile register 14, the L/S unit 15, the command unit 16, and the control unit 20 are connected in parallel to the internal bus 22 of the CPU 10. Therefore, for example, data and addresses may be bidirectionally transmitted between the internal bus 22, and the ALU 11, the FPU 12, the interrupt unit 13, the non-volatile register 14, the L/S unit 15, the command unit 16, and the control unit 20.

When the bit width for transmitting and receiving data or addresses is, for example, 32 bits, the internal bus 22 includes 32 signal lines corresponding to the bit width.

The data cache 17 is connected to the L/S unit 15 such that data maybe bidirectionally transmitted and received. In addition, the data cache 17 is connected to the bus IF 19 such that data may be bidirectionally transmitted and received to and from the non-volatile main memory 30.

The command cache 18 is connected so as to transmit commands to the command unit 16. In addition, the command cache 18 is connected to the bus IF 19 so as to receive commands from the non-volatile main memory 30.

When the internal bus 22, the data/address bus 41, and the external bus 42 are compared, the internal bus 22 is formed in a semiconductor chip and may transmit and receive data and addresses at the highest speed. The data/address bus 41 may transmit and receive data and addresses to and from the non-volatile main memory 30 at the second highest speed. The external bus 42 has the lowest transmission and reception speed.

As described above, the non-volatile register 14 and the non-volatile main memory 30 are readable and writable non-volatile memory elements and have a storage function of retaining (continuously retaining) the information ("1"/"0") even when no power is supplied in addition to when the power supply unit 90 supplies power.

Next, the non-volatile memory element will be described while being compared with a volatile memory element. The term "element" includes a cell (unit element), which is a storage unit (mainly a bit), a component (for example a DRAM which will be described below), which is a set of cells, and a device (an HDD which will be described below).

Examples of the volatile memory element include a DRAM (dynamic RAM) that retains the information ("1"/"0") on the basis of the presence or absence of charge stored in a capacitor and an SRAM (static RAM) that retains the information ("1"/"0") using a latch effect by a flip-flop (FF). In the volatile memory element, cells which are storage units are arranged on the semiconductor in a matrix chip. It is possible to access an arbitrary cell and read and write the information ("1"/"0") using lines that are arranged in a lattice shape between the cells and a driving circuit that is connected to the lines. Therefore, the volatile memory element is referred to as a RAM (random access memory).

In the DRAM, the size of the cell is less than that in the SRAM. The DRAM is used as a volatile main memory requiring high capacity in order to improve the degree of integration. However, in the DRAM, the charge stored in the capacitor is attenuated over time. Therefore, refreshment is performed at a predetermined time interval to return the charge to the original state such that the stored information ("1"/"0") is not lost over time.

The SRAM retains the information ("1"/"0") using the latch effect by the flip-flop (FF). In the SRAM, the size of the cell is greater than that in the DRAM, but the reading and writing speed is higher than that in the DRAM.

An example of the non-volatile memory element is an HDD (hard disk drive) in which a magnetic medium storing the information ("1"/"0") using the direction of a magnetic pole is formed on a disk. The HDD has high capacity, but the reading and writing speed (access speed) of the information ("1"/"0") is low since the information ("1"/"0") is read and written by a mechanical mechanism.

In addition, examples of the non-volatile memory element include a flash memory and an EEPROM (Electrically Erasable Programmable ROM) that store the information ("1"/"0") on the basis of the presence or absence of charge stored in the gate electrode (floating gate) of a MOS transistor. The flash memory and the EEPROM may magnetically read and write a state ("1"/"0"). However, in the flash memory and the EEPROM, the reading and writing speed, particularly, the writing speed is lower than that in the SRAM and the DRAM. The flash memory and the EEPROM have restrictions in the number of times data is rewritten.

In addition, examples of the non-volatile memory element includes a magnetic memory (magnetoresistive RAM: represented by MRAM), a ferroelectric memory (ferroelectric RAM: represented by FeRAM), a phase change memory (phase change RAM: represented by PRAM), and a resistance memory (resistance RAM: represented by ReRAM).

The MRAM includes two magnetic laminated films and a tunnel magnetic resistance film interposed therebetween and stores the information ("1"/"0") using a magnetoresistive (MR) effect in which the resistance of the tunnel magnetic resistance film is changed depending on the relative angle between the magnetizations of the magnetic laminated films which overlap each other. The FeRAM stores the information ("1"/"0") using the polarization of a ferroelectric material, such as PZT ($Pb(Zr,Ti)O_3$). The PRAM stores the information ("1"/"0") using a resistance change due to a change in the phase of chalcogenide. The ReRAM uses a large variation (CER (colossal electro-resistance) effect) in electric resistance due to the application of a voltage and stores information ("1"/"0") using a resistance variation.

In the non-volatile memory elements (the MRAM, the FeRAM, the PRAM, and the ReRAM), similarly to the DRAM and the SRAM, cells may be arranged on a semiconductor substrate in a matrix at high density, and data may be read and written at a high speed by a driving circuit which is integrally formed. In addition, in principle, the non-volatile memory elements do not have restrictions in the number of times data is rewritten or the number of rewrites is very large (the non-volatile memory elements have few restrictions in the number of rewrites).

Therefore, similarly to the SRAM and the DRAM, the non-volatile memory elements (the MRAM, the FeRAM, the PRAM, and the ReRAM) are likely to be applied to, for example, a main memory (non-volatile main memory 30) and a register (non-volatile register 14).

In this exemplary embodiment, an example of the non-volatile register 14 and the non-volatile main memory 30 is an MRAM. In addition, the non-volatile register 14 and the non-volatile main memory 30 may be an FeRAM, a PRAM, or an ReRAM, in addition to the MRAM.

The operation of the information processing device 1 will be described.

The CPU 10 of the information processing device 1 reads, for example, a command, an address, and data from the non-volatile main memory 30 through the bus bridge 40 and the bus IF 19 on the basis of the control of the control unit 20. Then, the address and the data are written to the non-volatile register 14 through the data cache 17 and the L/S unit 15. Similarly, the command is transmitted to the command unit 16 through the command cache 18 and is decoded by the command unit 16. Then, calculation performed by the ALU 11 or the FPU 12 is designated.

The ALU 11 or the FPU 12 performs the designated calculation using, for example, the data and the address written to the non-volatile register 14. As a result of the calculation, for example, the obtained data and address are written to the non-volatile register 14 and are also transmitted to the UIIF 50, the communication IF 60, the IOIF 70, and the SBIF 80 through the L/S unit 15, the data cache 17, the bus IF 19, and the bus bridge 40. In this way, the information processing device controls the UI 120, the image forming unit 130, the image reading unit 140, and the transmitting and receiving unit 150 connected thereto.

When the UI 120 receives an instruction to turn on or off the power supply and instructions related to operations using the scanning function, the print function, the copy function, and the facsimile function from the user, the interrupt unit 13 notifies the control unit 20 of the occurrence of an interrupt. The control unit 20 acquires, for example, a command and data corresponding to the interrupt from the non-volatile main memory 30 as described above and performs an interrupt process.

The functions of the reset unit 25 will be described together with the non-volatile register 14.

The image forming apparatus 100 includes the operation mode in which all functions are operable (in an on state) and the energy saving mode in which some functions (the UIIF 50, the communication IF 60, and the feed control unit 90a of the power supply unit 90) are operable (in an on state) and the other functions are stopped (in an off state). In the energy saving mode, for example, when receiving a facsimile through the communication line 200 or when a signal for starting the use of the apparatus is received from the user, the image forming apparatus 100 returns to the operation mode.

The state in which all functions of the image forming apparatus 100 are stopped indicates the stop mode.

The operation mode, the energy saving mode, and the stop mode will be described in detail below.

FIGS. 3A and 3B are diagrams illustrating the structure of the non-volatile register 14 and a portion of the non-volatile main memory 30. FIG. 3A shows the structure of the non-volatile register 14 and FIG. 3B shows the structure of a portion of the non-volatile main memory 30.

As described above, in this exemplary embodiment, the non-volatile main memory 30 stores, for example, an OS, programs, text, constants, and variables. In addition, the non-volatile main memory 30 may be used as a work area that temporarily stores, for example, data. However, FIG. 3B shows the structure of an area of the non-volatile main memory 30 which stores information related to the non-volatile register 14.

First, the non-volatile register 14 will be described. The non-volatile register 14 includes registers Reg0, Reg1, Reg2, . . . each of which is capable of storing, for example, 32-bit data. When the registers Reg0, Reg1, Reg2, . . . are not distinguished from each other, they are referred to as registers Reg. The registers Reg0, Reg1, Reg2, . . . store register values Reg0, Reg1, Reg2, . . . which are represented by the same reference numerals as the register Reg. When the register values are not distinguished from each other, they are referred to as register values Reg.

The registers Reg0, Reg1, Reg2, . . . are distinguished by register addresses R0, R1, R2, . . . . When the register addresses R0, R1, R2, . . . are not distinguished from each other, they are referred to as register addresses R. In FIG. 3A, for example, in the register address R0 (0x8100), "0x8100" indicates a detailed register address. In addition, "0x" indicates a hexadecimal number.

A power flag Pf is stored in the register Reg0. An off ("0") state or an on ("1") state is set to the power flag Pf. When the power flag Pf is set to the off ("0") state, the image forming apparatus 100 is in the operation mode, which will be described below. On the other hand, when the power flag Pf set to the on ("1") stat, the image forming apparatus 100 changes from the operation mode to the energy saving mode, which will be described below.

When the image forming apparatus 100 changes from the stop mode to the operation mode and returns from the energy saving mode to the operation mode, the power flag Pf needs to be set to the off ("0") state. When the power flag Pf is maintained in the on ("1") state, it is difficult for the image forming apparatus 100 to change to the operation mode.

An end flag Ps is stored in the register Reg1. An off ("0") state or an on ("1") state is set to the end flag Ps. When the image forming apparatus 100 is turned on and is in the operation state, the end flag Ps is set to the off ("0") state. When the supply of power to the image forming apparatus 100 is stopped (is turned off), the power supply unit 90 turns off the supply of power according to a predetermined sequence. In this case, immediately before the supply of power is turned off, the end flag Ps is set from the off ("0") state to the on ("1") state.

When the power supply unit 90 does not stop the supply of power according to a predetermined sequence, for example, when the supply of power to the power supply unit 90 is stopped, the end flag Ps is maintained in the off ("0") state, without being set from the off ("0") state to the on ("1") state.

For example, when an unexpected event, such as a general power failure, a temporary power failure, or a case in which a power plug is carelessly pulled out occurs, the supply of power to the power supply unit 90 is stopped.

A configuration status St is stored in the register Reg2. The configuration status St is set to an on ("1") state when each configuration which may be provided in the image forming apparatus 100 is present. When the configuration is absent, the configuration status St is set to an off ("0") state. That is, the reference of the configuration status St makes it possible to know configurations provided in the image forming apparatus 100. An apparatus configuration when the image forming apparatus 100 has started previously is referred to as a "previous apparatus configuration" and an apparatus configuration when the image forming apparatus 100 starts currently is referred to as a "current apparatus configuration".

An identification information ID (Identification) is stored in the register Reg3, calendar information is stored in the register Reg4, parameters are stored in the register Reg5, and a program counter PC is stored in the register Reg6.

For example, data and addresses used by the ALU 11 and the FPU 12 to perform calculation are stored in the subsequent registers (a register Reg7 or the subsequent registers). The identification information ID, the calendar information, the parameters, and the program counter PC will be described in detail below.

The program counter PC is the address of the non-volatile main memory 30 at which the next command executed by the CPU 10 is stored. The address of the program counter PC is sequentially updated such that the information processing device 1 performs a process.

Each of the power flag Pf and the end flag Ps has a binary value, such as the off ("0") state and the on ("1") state, and is represented by one bit. Therefore, the power flag Pf and the end flag Ps may be set to different bits in one register Reg. In addition, the power flag Pf and the end flag Ps may be set to bits which are not used to store data and addresses in different registers Reg which store, for example, data and addresses.

The register Reg0 storing the power flag Pf is connected to the reset unit 25.

Next, the structure of an area storing information (register information) related to the non-volatile register 14 of the non-volatile main memory 30 will be described with reference to FIG. 3B. Similarly to the non-volatile register 14, an address (memory address M) is designated to read data with a predetermined number of bits from this area.

In this exemplary embodiment, it is assumed that the number of bits of data which may be read once by the designation of the memory address M is, for example, 64 bits that is twice the number of bits of the register Reg in the non-volatile register 14.

In this exemplary embodiment, this area is divided into five register information groups G1, G2, G3, G4, and G5. The head of the register information group G1 is a memory address M00, the head of the register information group G2 is a memory address M10, the head of the register information group G3 is a memory address M20, the head of the register information group G4 is a memory address M30, and the head of the register information group G5 is a memory address M40. When the register information groups G1, G2, G3, G4, and G5 are not distinguished from each other, they are referred to as register information groups G. When the memory addresses M00, M10, M20, M30, and M40 are not distinguished from each other, they are referred to as memory addresses M.

In FIG. 3B, for example, in the memory address M00 (0x1000), "0x1000" is a detailed memory address.

A set of the register address R of the non-volatile register 14 and an initial value D (in FIG. 3B, when initial values D00, D01, D02, and D04 are not distinguished from each other, they are referred to as initial values D) for initialization is stored at each memory address M of the non-volatile main memory 30. For example, the register address R3 (0x8103) is stored at the high 32 bits of the memory address M00 and the initial value D01 is stored at the low 32 bits of the memory address M00.

The set of the register address R and the initial value D indicates that the register value Reg of the register Reg designated by the register address R is rewritten (changed) to the initial value D.

In addition, setting the initial value D to, for example, "0x0000" or "0xFFFF" is setting all bits to "0" or "1" to delete the register value Reg. Therefore, deleting the register value Reg indicates rewriting the register value Reg to the initial value D.

When the mode is changed from the stop mode to the operation mode (case 1), the register information group G1 indicates the register address R of the register Reg rewriting the register value Reg and the initial value D to be written. When the mode is changed from the operation mode to the stop mode (case 2), the register information group G2 indicates the register address R of the register Reg rewriting the register value Reg and the initial value D to be written. When the mode is changed from the operation mode to the energy saving mode (case 3), the register information group G3 indicates the register address R of the register Reg rewriting the register value Reg and the initial value D to be written. When the mode returns from the energy saving mode to the operation mode (case 4), the register information group G4 indicates the register address R of the register Reg rewriting the register value Reg and the initial value D to be written.

In addition, when the information processing device 1 is operated first (initialized) (case 5), the register information group G5 indicates the register address R of the register Reg rewriting the register value Reg and the initial value D to be written.

These will be described in the operation of the image forming apparatus 100, which will be described below.

It is preferable that, when the image forming apparatus 100 is not used, it be turned off. It is desirable that, when the image forming apparatus 100 is used, it be rapidly operated.

As described above, the image forming apparatus 100 according to this exemplary embodiment includes the operation mode in which the image forming apparatus 100 is supplied with power and is in an operable state (on state) and the energy saving mode in which only some functions are operable (in an on state) and the other functions are stopped (in an off state), thereby reducing power consumption, as compared to the operation mode. In the energy saving mode, for example, when a facsimile is received through the communication line 200 or when a signal for starting the use of the image forming apparatus 100 is received, the image forming apparatus 100 returns to the operation mode.

In the stop mode, no power is supplied.

The energy saving mode will be described with reference to FIG. 2.

In the energy saving mode, in order to improve an energy saving effect, it is preferable that the CPU 10, the non-volatile main memory 30, the bus bridge 40, the UIIF 50, the communication IF 60, the IOIF 70, and the SBIF 80 of the information processing device 1, which is a controller, be turned off. In addition, it is preferable that the power supply unit 90 be turned off. That is, in the energy saving mode, the UI 120, the transmitting and receiving unit 150, and the feed control unit 90a of the power supply unit 90 are turned on, and the CPU 10, the non-volatile main memory 30, the bus bridge 40, the UIIF 50, the communication IF 60, the IOIF 70, the SBIF 80, a portion of the power supply unit 90 except for the feed control unit 90a of the information processing device 1, the image forming unit 130, and the image reading unit 140 are turned off.

Signal lines are provided such that signals are transmitted from each of the UI 120 and the transmitting and receiving unit 150 to the feed control unit 90a of the power supply unit 90 in the information processing device 1.

The feed control unit 90a provided in the power supply unit 90 receives a signal from the UI 120 or the transmitting and receiving unit 150 to turn on the power supply unit 90, thereby resuming the supply of power to the CPU 10, the non-volatile main memory 30, the bus bridge 40, the UIIF 50, the communication IF 60, the IOIF 70, the SBIF 80 of the information processing device 1, the image forming unit 130, and the image reading unit 140 which are in an off state.

That is, even in the energy saving mode, power is supplied from a power supply (not shown) to the UI 120, the transmitting and receiving unit 150, and the feed control unit 90a of the power supply unit 90 in the information processing device 1.

In this exemplary embodiment, the power supply unit 90 of the information processing device 1 supplies power to the image forming unit 130 and the image reading unit 140. However, the same feed control unit as the feed control unit 90a may be provided and the supply of power to the image forming unit 130 and the image reading unit 140 may be resumed by the signal from the UI 120 or the transmitting and receiving unit 150.

Figure 4A:
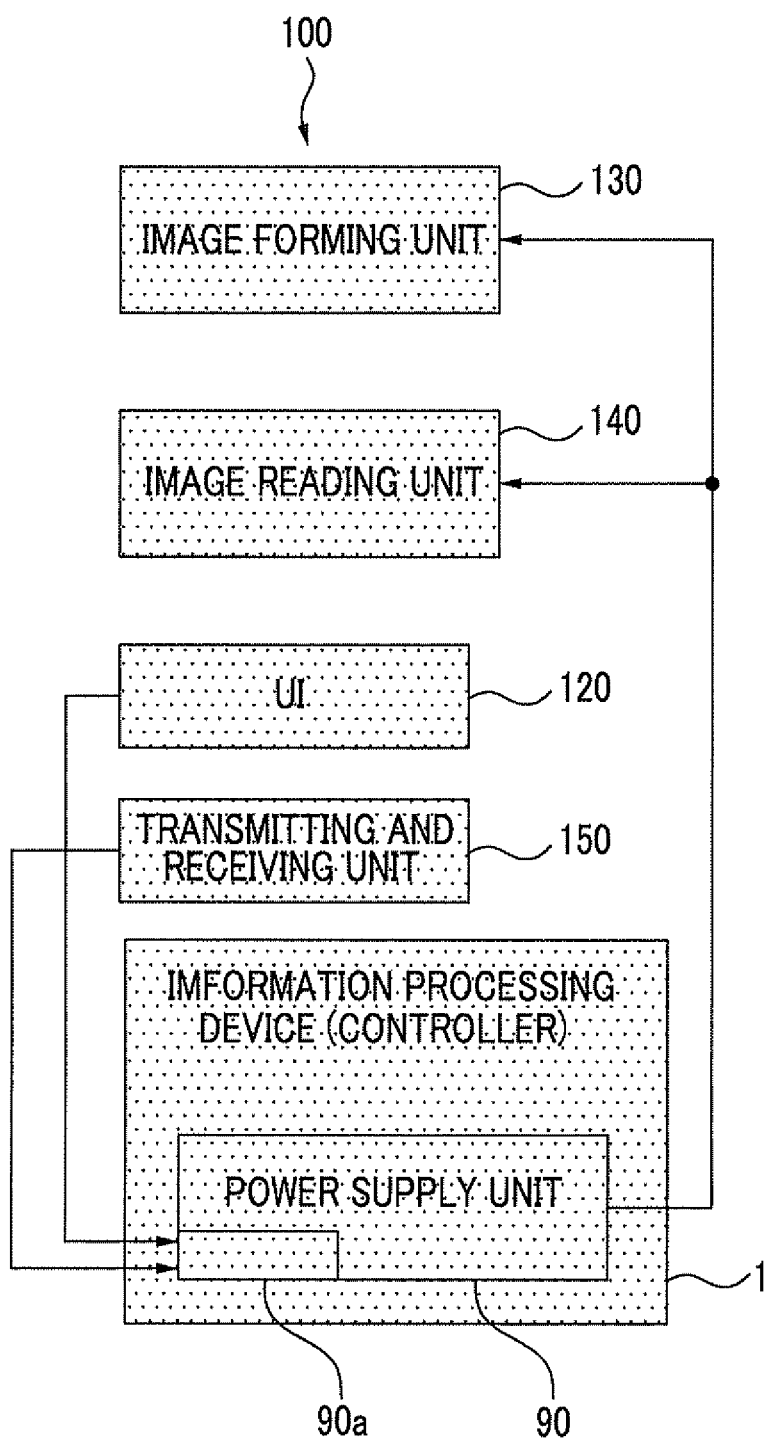
FIGS. 4A and 4B are diagrams illustrating comparison between the operation mode and the energy saving mode of the image forming apparatus.
Figure 4B:
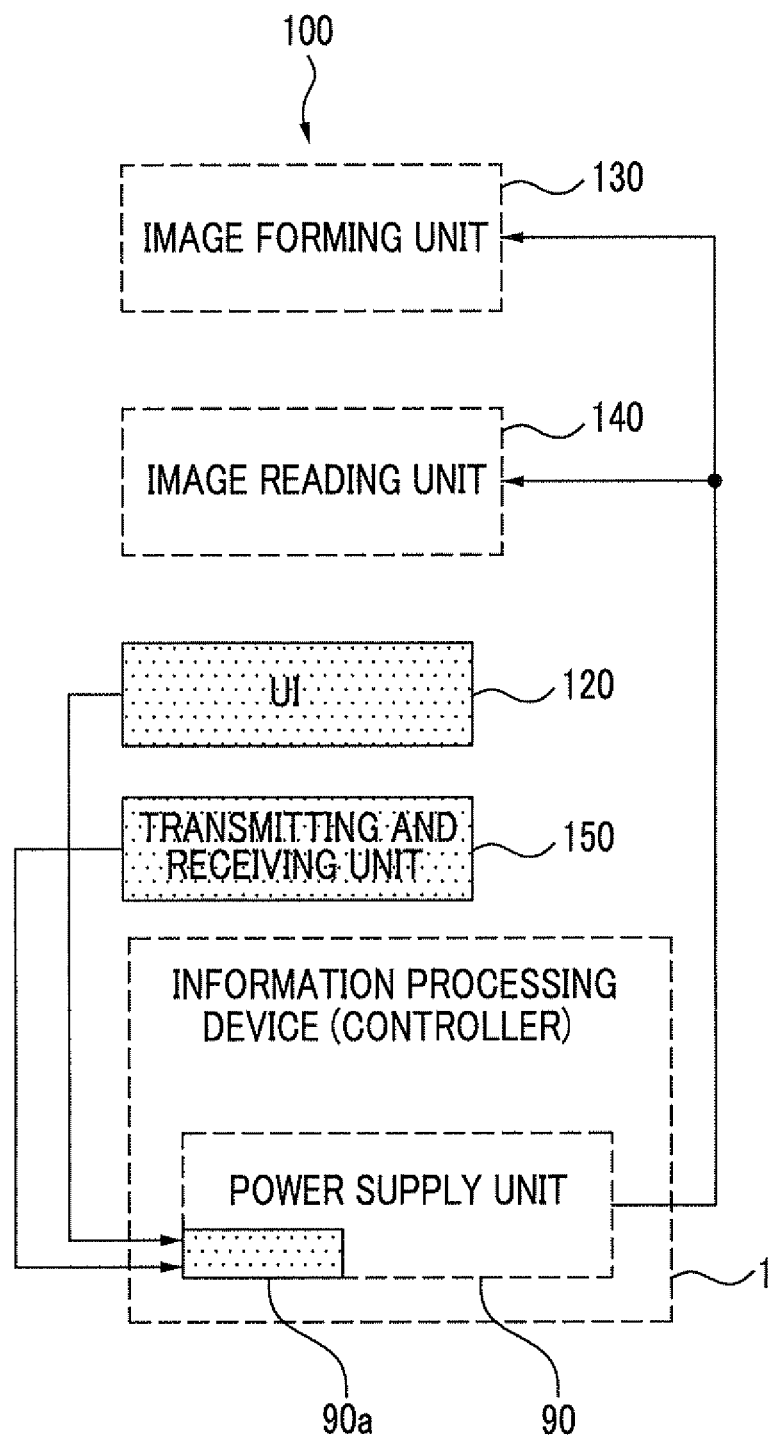

FIGS. 4A and 4B are diagrams illustrating the comparison between the operation mode and the energy saving mode of the image forming apparatus 100. FIG. 4A shows the operation mode and FIG. 4B shows the energy saving mode. A component which is in an on state is surrounded by a solid line and is represented by halftone dots. A component which is in an off state is surrounded by a dashed line.

In the operation mode shown in FIG. 4A, the information processing device 1, the UI 120, the image forming unit 130, the image reading unit 140, and the transmitting and receiving unit 150 are all in an on state. In the energy saving mode shown in FIG. 4B, the UI 120, the transmitting and receiving unit 150, and the feed control unit 90a of the power supply unit 90 in the information processing device 1 are in an on state, and the image forming unit 130, the image reading unit 140, and a portion of the information processing device 1 except for the feed control unit 90a of the power supply unit 90 are in an off state (sleep state).

It is assumed that, for the period for which the image forming apparatus is in the energy saving mode, when the image reading unit 140 is a scanner, the user lifts the upper cover of the scanner in order to use the image forming apparatus 100. The upper cover of the scanner is a kind of the UI 120. Therefore, when the user lifts the upper cover of the scanner, a signal for instructing the start of the image forming apparatus 100 is transmitted from the UI 120 to the feed control unit 90a of the power supply unit 90 in the information processing device 1. In this way, the power supply unit 90 is turned on. Then, the information processing device 1, the image forming unit 130, and the image reading unit 140 are supplied with power from the power supply unit 90 and are operated.

In this way, the image forming apparatus 100 returns to the operation mode.

Similarly, for the period for which the image forming apparatus is in the energy saving mode, when data is received from the facsimile apparatus 400 through the communication line 200, the transmitting and receiving unit 150 detects the data and a signal for instructing the start of the image forming apparatus 100 is transmitted to the feed control unit 90a of the power supply unit 90 in the information processing device 1. In this way, the power supply unit 90 is turned on. Then, similarly to the above, the information processing device 1, the image forming unit 130, and the image reading unit 140 are supplied with power from the power supply unit 90 and are operated.

In this way, the image forming apparatus 100 returns to the operation mode.

A case in which the mode is changed from the energy saving mode to the operation mode has been described above.

When the mode is changed from the stop mode in which all components including the UI 120, the transmitting and receiving unit 150, and the feed control unit 90a of the power supply unit 90 are turned off to the operation mode, the power supply unit 90 is turned on and the information processing device 1, the UI 120, the image forming unit 130, the image reading unit 140, and the transmitting and receiving unit 150 are supplied with power from the power supply unit 90 and are operated.

When the mode is changed from the operation mode to the stop mode, the power supply unit 90 stops the supply of power to the information processing device 1, the UI 120, the image forming unit 130, the image reading unit 140, and the transmitting and receiving unit 150. Then, the power supply unit 90 is also turned off.

In the change in the mode from the operation mode to the stop mode and from the operation mode to the energy saving mode, the power supply unit 90 stops the supply of power to each component according to a predetermined sequence for stopping the supply of power.

In this exemplary embodiment, the non-volatile register 14 which is capable of storing information even when no power is supplied is used to store the register value Reg stored when power is supplied. Therefore, when the mode is changed from the stop mode to the operation mode (case 1) and when the mode returns from the energy saving mode to the operation mode (case 4), the non-volatile register 14 stores the register value Reg stored in each register Reg before the mode is changed to the stop mode or the energy saving mode.

However, in the case in which the mode is changed from the stop mode to the operation mode (case 1) and in the case in which the mode returns from the energy saving mode to the operation mode (case 4), when the stored register value Reg is used without any change, errors are likely to occur. The register value Reg causing errors needs to be deleted or set (initialize) to another value (initial value D) when the mode is changed from the stop mode to the operation mode (case 1) and when the mode returns from the energy saving mode to the operation mode (case 4).

An example of the register value causing errors is identification information ID (Identification) for identifying the user (for example, a person). For example, in the image forming apparatus 100, in the case in which the mode is changed from the stop mode to the operation mode (case 1) and the case in which the mode returns from the energy saving mode to the operation mode (case 4), when the identification information ID stored in the register Reg3 is not deleted, it is difficult to use the identification information ID of the user before the mode is changed to the stop mode or the energy saving mode. That is, it is difficult to identify the user and user data (for example, client information) leaks.

Therefore, the identification information ID needs to be deleted or initialized when the mode is changed from the stop mode to the operation mode (case 1) and when the mode returns from the energy saving mode to the operation mode (case 4). In addition, the identification information ID may be deleted or initialized when the mode is changed from the operation mode to the stop mode (case 2) and when the mode is changed from the operation mode to the energy saving mode (case 3).

An example of the register value causing errors is calendar information about year, month, day, and time. During the period for which the image forming apparatus is in the stop mode or the energy saving mode, the register value Reg of the register Reg4 storing the calendar information is not updated. Therefore, the register value needs to be deleted or initialized when the mode is changed from stop mode to the operation mode (case 1) and when the mode returns from the energy saving mode to the operation mode (case 4). After the register value is deleted, the calendar information is newly acquired by, for example, a timer (not shown) provided in the information processing device 1 and the calendar information of the register Reg4 storing the calendar information is set.

An example of the register value causing errors is the above-mentioned power flag Pf. When the power flag Pf is changed from the off ("0") state to the on ("1") state, the image forming apparatus 100 changes to the energy saving mode. When the power flag Pf is maintained in the on ("1") state, it is difficult for the image forming apparatus 100 to return to the operation mode. Therefore, when the image forming apparatus 100 returns to the operation mode, it is necessary to set the power flag Pf from the on ("1") state to the off ("0") state. It is difficult for the CPU 10 of the information processing device 1 to perform the setting of the power flag Pf. Therefore, the reset unit 25 connected to the feed control unit 90a needs to be used to set the power flag Pf from the on ("1") state to the off ("0") state when the mode is changed from the stop mode to the operation mode (case 1) and when the mode is changed from the energy saving mode to the operation mode (case 4).

In addition, an example of the register value causing errors is the number of sheets stored in the tray of the image forming unit 130 which stores, for example, sheets or the size of the sheets. For the period for which the image forming apparatus is in the energy saving mode or the stop mode, in some cases, the tray is drawn and the number of sheets increases or decreases or the size of the sheet is changed. In this case, when the register value Reg of the register Reg storing the number of sheets or the size of the sheet is equal to the register value Reg before the mode is changed to the energy saving mode or the stop mode, an operation error occurs in the image forming apparatus 100.

Therefore, when the mode is changed from the stop mode to the operation mode (case 1) and when the mode returns from the energy saving mode to the operation mode (case 4), it is necessary to delete or initialize the register value Reg of the register Reg which stores parameters related to each configuration, such as the number of sheets or the size of the sheet in the paper tray of the image forming unit 130. In addition, the register value Reg may be deleted or initialized when the mode is changed from the operation mode to the stop mode (case 2) or when the mode is changed from the operation mode to the energy saving mode (case 3).

After the register value is deleted, for example, the number of sheets or the size of the sheet in the tray is newly acquired from the image forming unit 130 and the register value Reg is set.

Furthermore, an example of the register value causing errors is the configuration status St. For the period for which the image forming apparatus is in the stop mode, when the configuration of, for example, the UI 120, the image forming unit 130, the image reading unit 140, and the transmitting and receiving unit 150 provided in the image forming apparatus 100 is changed, the apparatus configuration (current apparatus configuration) detected when the mode is changed from the stop mode to the operation mode (case 1) is not identical to the configuration status St (previous apparatus configuration) stored in the register Reg2 of the non-volatile register 14. In this case, it is necessary to delete the configuration status St stored in the register Reg2 when the mode is changed from the stop mode to the operation mode (case 1). The detected current apparatus configuration is set as the configuration status St to the register Reg2. Then, it is necessary to delete or initialize the register values Reg of all of the registers Reg related to the control of the operation of the image forming apparatus 100.

In addition, an example of the register value causing errors is the end flag Ps. When the image forming apparatus 100 is not changed from the operation mode to the stop mode (case 2) according to a predetermined sequence, the end flag Ps sets to the off ("0") state. In this case, there is a concern that the information processing device 1 will not be in the normal state. Therefore, in the case in which the image forming apparatus 100 is changed from the stop mode to the operation mode (case 1), when the image forming apparatus 100 is operated using the register value Reg stored in the non-volatile register 14, there is a concern that an operation error will occurs. When the end flag Ps is set to the off ("0") state and the image forming apparatus 100 is changed from the stop mode to the operation mode (case 1), it is necessary to delete or initialize the register values Reg of all of the registers Reg related to the control of the operation of the image forming apparatus 100, such as the register Reg6 storing the program counter PC.

FIG. 3A shows, as an example, the power flag Pf (register Reg0), the end flag Ps (register Reg1), the configuration status St (register Reg2), the identification information ID (register Reg3), the calendar information (register Reg4), the parameter (register Reg5), and the program counter PC (register Reg6) in the non-volatile register 14.

The register values Reg are an illustrative example and other register values Reg may be included.

Operation of Information Processing Device 1

Next, the operation of the information processing device 1 will be described.

Hereinafter, case 1 in which the mode is changed from the stop mode to the operation mode, case 2 in which the mode is changed from the operation mode to the stop mode, case 3 in which the mode is changed from the operation mode to the energy saving mode, and case 4 in which the mode returns from the energy saving mode to the operation mode will be described. In case 5 in which the information processing device 1 is operated first (initialized), the end flag is set to the off ("0") state.

Case 1: Mode Change from Stop Mode to Operation Mode

Figure 5:
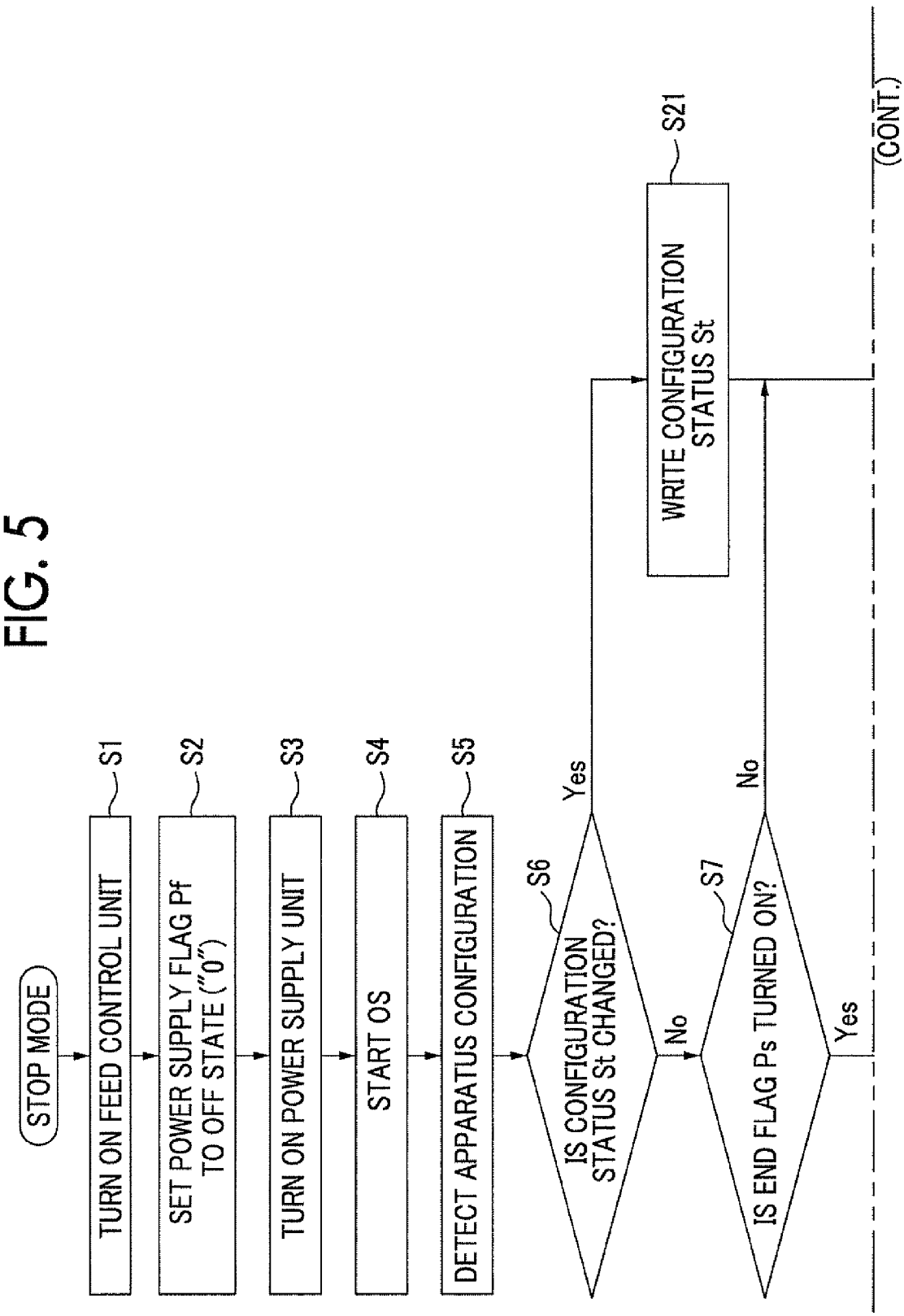
FIG. 5 is a flowchart illustrating a mode change from the stop mode to the operation mode.

FIG. 5 is a flowchart illustrating a mode change from the stop mode to the operation mode.

When the power switch is turned on, the feed control unit 90a is turned on (Step 1). Then, the reset unit 25 is supplied with power and sets the power flag Pf stored in the register Reg0 with the register address R0 in the non-volatile register 14 to the off ("0") state (Step 2). Then, the power supply unit 90 is turned on (Step 3). Then, power is supplied to the information processing device 1. Then, the CPU 10 in an operation state reads the OS from the non-volatile main memory 30 and starts the OS (Step 4).

Then, the CPU 10 detects the apparatus configuration of the image forming apparatus 100 using each IF (the UIIF 50, the communication IF 60, the IOIF 70, and the SBIF 80) connected thereto through the bus bridge 40 and the external bus 42 (Step 5).

In Step 5, for example, a hardware method for detecting whether a connector is physically connected to each IF may be used or a software method for detecting whether communication with a connection target is performed through each IF may be used.

Then, the CPU 10 compares the configuration status St, which is the apparatus configuration (previous apparatus configuration) at the time of the previous startup which is stored in the register Reg2 of the non-volatile register 14, with the detected current apparatus configuration and determines whether there is a change in the apparatus configuration (Step 6). When the determination result in Step 6 is "No", that is, when the current apparatus configuration is the same as the previous apparatus configuration, the CPU 10 determines whether the end flag Ps is set to the on ("1") state (Step 7). Next, a case in which the determination result is Step 7 is "Yes" will be described. A case in which the determination result is Step 7 is "No" will be described later.

When the determination result in Step 7 is "Yes", that is, when the image forming apparatus is changed to the previous stop mode according to a predetermined sequence, the address (read memory address M) of the non-volatile main memory 30 for reading register information is set to the memory address M00 which is the head of the register information group G1 (Step 8). Then, the register address R and the initial value D are read (Step 9).

Then, the CPU 10 determines whether the register value Reg at the register address R is equal to the initial value D (Step 10). When the determination result in Step 10 is "Yes", the CPU 10 determines whether processing for the register information group G1 is completed (Step 11). When the determination result in Step 11 is "No", the CPU 10 moves up the memory address M by "1" and returns to Step 9. Then, the CPU 10 reads the register address R and the initial value D from the non-volatile main memory 30 and continuously performs comparison with the register value Reg.

When the determination result in Step 10 is "No", the CPU 10 sets the initial value D to the register value Reg at the register address R (Step 12).

When the determination result in Step 11 is "Yes", the CPU 10 sets the end flag Ps to the off ("0") state (Step 13).

In this way, the mode is changed from the stop mode to the operation mode.

When the determination result in Step 6 is "Yes", that is, when the previous apparatus configuration is different from the current apparatus configuration, it is necessary to initialize the information processing device 1, which is a controller. First, the CPU 10 stores the current apparatus configuration in the configuration status St of the register Reg2 in the non-volatile register 14 (Step 21).

The CPU 10 sets the address (read memory address M) of the non-volatile main memory 30 for reading the register information to the memory address M40 which is the head of the register information group G5 (Step 22).

Then, similarly to Step 9, the CPU 10 reads the register address R and the initial value D (Step 23) and determines whether the register value Reg at the register address R is equal to the initial value D (Step 24). When the determination result in Step 24 is "Yes", the CPU 10 determines whether processing for the register information group G5 is completed (Step 25). When the determination result in Step 25 is "No", the CPU 10 moves up the memory address M by "1" and returns to Step 23. Then, the CPU 10 reads the register address R and the initial value D from the non-volatile main memory 30 and continuously performs comparison with the register value Reg.

When the determination result in Step 24 is "No", the CPU 10 sets the initial value D to the register value Reg at the register address R (Step 26).

When the determination result in Step 7 is "No", that is, when the image forming apparatus is not changed to the previous stop mode according to the predetermined sequence, it is necessary to initialize the information processing device 1 which is a controller. Therefore, the process may be performed from Step 22.

As described above, in case 1 in which the mode is changed from the stop mode to the operation mode, when the apparatus configuration is not changed and the end flag Ps is in the on ("1") state, the register information group G1 may be read from the non-volatile main memory 30, and the identification information ID, the calendar information, and the parameters may be deleted or initialized. Since the program counter PC is not changed, it is possible to resume the operation from the state immediately before the mode is changed to the previous stop mode.

In contrast, when the apparatus configuration is changed or when the end flag Ps is in the off ("0") state, it is necessary to initialize the information processing device 1 serving as a controller. Therefore, it is necessary to initialize all register values Reg including the program counter PC which are related to the control of the image forming apparatus 100. Thus, the register information group G5 is read from the non-volatile main memory 30 and the register values including the program counter PC are deleted or initialized.

Case 2: Mode Change from Operation Mode to Stop Mode

Figure 6:
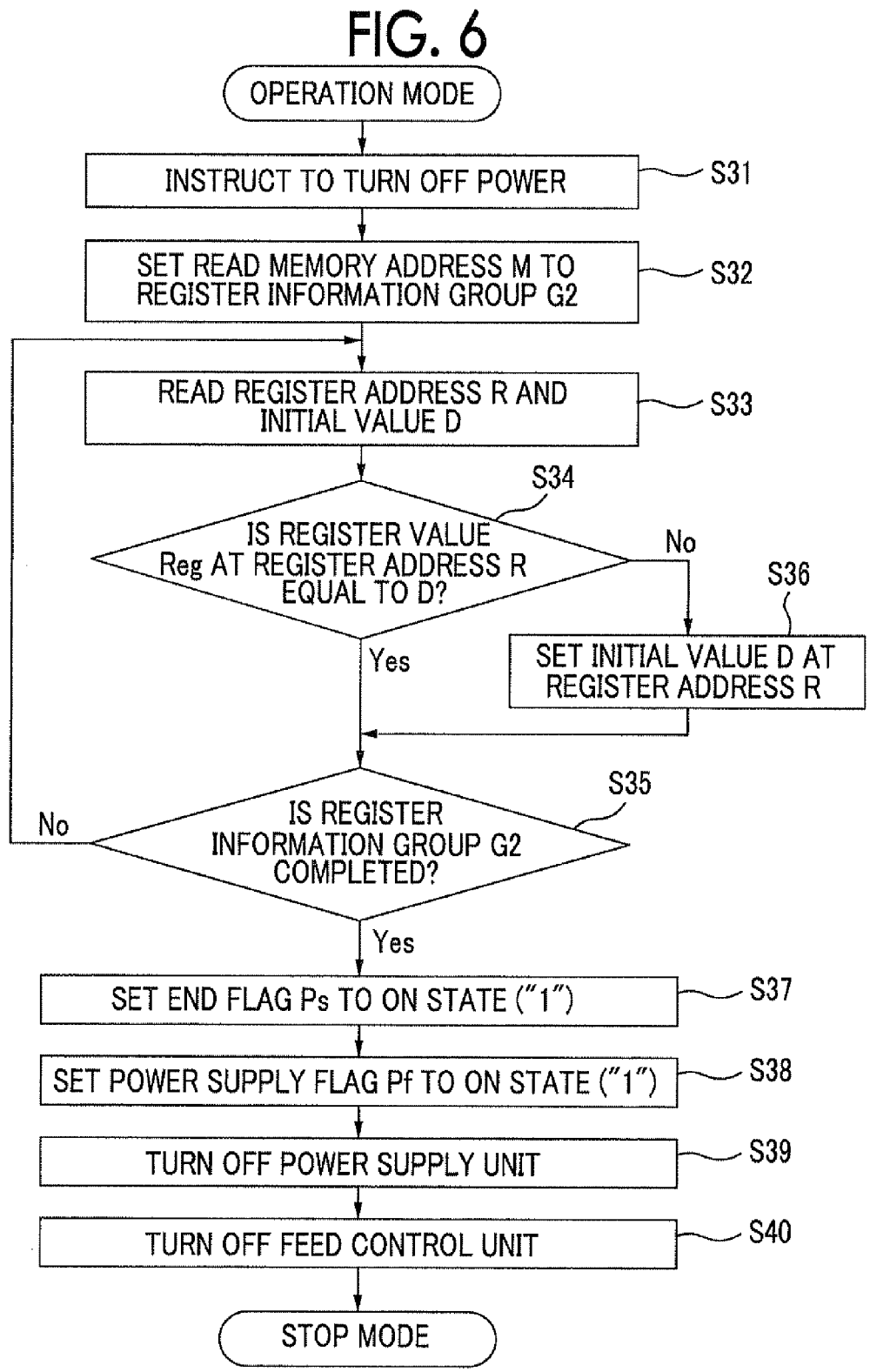
FIG. 6 is a flowchart illustrating a mode change from the operation mode to the stop mode.

FIG. 6 is a flowchart illustrating a mode change from the operation mode to the stop mode.

The CPU 10 acquires an instruction to turn off power from the user through the UI 120 (Step 31). The CPU 10 sets the address (read memory address M) of the non-volatile main memory 30 for reading the register information to the memory address M10 which is the head of the register information group G2 (Step 32).

Similarly to Step 9 shown in FIG. 5, the CPU 10 reads the register address R and the initial value D (Step 33). Then, the CPU 10 determines whether the read initial value D is equal to the register value Reg at the register address R (Step 34). When the determination result in Step 34 is "Yes", the CPU 10 determines whether processing for the register information group G2 is completed (Step 35). When the determination result in Step 35 is "No", the CPU 10 moves up the memory address M by "1" and returns to Step 33. Then, the CPU 10 reads the register address R and the initial value D from the non-volatile main memory 30 and continuously performs comparison with the register value Reg.

On the other hand, when the determination result in Step 34 is "No", the CPU 10 sets the initial value D to the register value Reg at the register address R (Step 36).

Then, the CPU 10 sets the end flag Ps of the register value Reg1 at the register address R1 to the on ("1") state (Step 37). In addition, the CPU 10 sets the power flag Pf of the register value Reg0 at the register address R0 to the on ("1") state (Step 38). Then, a portion of the power supply unit 90 except for the feed control unit 90a is turned off (Step 39) and the feed control unit 90a is also turned off (Step 40).

In the way, the mode is changed from the operation mode to the stop mode.

When the mode is changed from the operation mode to the stop mode, the identification information ID of the register Reg3 designated by the register information group G2 may be deleted or initialized.

Case 3: Mode Change from Operation Mode to Energy Saving Mode

FIG. 7 is a flowchart illustrating a mode change from the operation mode to the energy saving mode.

The CPU 10 acquires an instruction to change to the energy saving mode from the user through the UI 120 or when detecting that the image forming apparatus 100 is not used for a predetermined period of time (Step 41). The CPU 10 sets the address (read memory address M) of the non-volatile main memory 30 for reading the register information to the memory address M20 which is the head of the register information group G3 (Step 42).

Then, similarly to Step 9 shown in FIG. 5, the CPU 10 reads the register address R and the initial value D (Step 43). Then, the CPU 10 determines whether the read initial value D is equal to the register value Reg at the register address R (Step 44). When the determination result in Step 44 is "Yes", the CPU 10 determines whether processing for the register information group G3 is completed (Step 45). When the determination result in Step 45 is "No", the CPU 10 moves up the memory address M by "1" and returns to Step 43. Then, the CPU 10 reads the register address R and the initial value D from the non-volatile main memory 30 and continuously performs comparison with the register value Reg.

On the other hand, when the determination result in Step 44 is "No", the CPU 10 sets the initial value D to the register value Reg at the register address R (Step 46).

Then, the CPU 10 sets the power flag Pf of the register Reg0 to the on ("1") state (Step 47). Then, a portion of the power supply unit 90 other than the feed control unit 90a is turned off (Step 48).

In this way, the mode is changed from the operation mode to the energy saving mode.

When the mode is changed from the operation mode to the energy saving mode, the identification information ID of the register Reg3 designated by the register information group G3 may be deleted or initialized.

Case 4: Mode Change from Energy Saving Mode to Operation Mode

FIG. 8 is a flowchart illustrating a mode change from the energy saving mode to the operation mode.

The feed control unit 90a acquires an instruction to return to the operation mode through the UI 120 or the transmitting and receiving unit 150 (Step 51). Then, the feed control unit 90a supplies power to the reset unit 25 and sets the power flag Pf to the off ("0") state (Step 52). In addition, the feed control unit 90a turns on the power supply unit 90 (Step 53).

The CPU 10 the address (read memory address M) of the non-volatile main memory 30 for reading the register information to the memory address M30 which is the head of the register information group G4 (Step 54).

Then, similarly to Step 9 shown in FIG. 5, the CPU 10 reads the register address R and the initial value D (Step 55). Then, the CPU 10 determines whether the read initial value D is equal to the register value Reg at the register address R (Step 56). When the determination result in Step 56 is "Yes", the CPU 10 determines whether processing for the register information group G4 is completed (Step 57). When the determination result in Step 57 is "No", the CPU 10 moves up the memory address M by "1" and returns to Step 55. Then, the CPU 10 reads the register address R and the initial value D from the non-volatile main memory 30 and continuously performs comparison with the register value Reg.

On the other hand, when the determination result in Step 56 is "No", the CPU 10 sets the initial value D to the register value Reg of the register address R (Step 58).

In this way, the mode is changed from the energy saving mode to the operation mode.

When the mode is changed from the energy saving mode to the operation mode, the identification information ID, the calendar information, and the parameters of the register Reg3 designated by the register information group G4 may be deleted or initialized.

In this case, since the program counter PC is not rewritten, the image forming apparatus 100 resumes the operation from the state immediately before the mode is changed to the energy saving mode.

When the mode is changed from the energy saving mode to the stop mode, the image forming apparatus may return from the energy saving mode to the operation mode and then change from the operation mode to the stop mode.

This exemplary embodiment includes the non-volatile register 14. Therefore, even when no power is supplied, the register value Reg of the non-volatile register 14 is not deleted (cleared). Therefore, when the mode is changed from the stop mode to the operation mode (case 1) or when the mode returns from the energy saving mode to the operation mode (case 4), it is necessary to delete or initialize the register value Reg causing errors.

As described above, in this exemplary embodiment, register information groups are stored in the non-volatile main memory 30 so as to correspond to the modes (the stop mode, the operation mode, and the energy saving mode) before and after a mode change. Therefore, when the mode is changed, the register value is deleted or initialized with reference to the register information.

In this way, when the mode of the image forming apparatus 100 is changed, the register value causing errors is deleted or initialized. Therefore, the occurrence of an operation error is prevented.

In this exemplary embodiment, the power flag Pf of the non-volatile register 14 is set to the on ("1") state, thereby changing the mode to the energy saving mode. Therefore, the power flag Pf is maintained in the on ("1") state in the energy saving mode. As a result, the mode is prevented from returning from the energy saving mode to the operation mode.

In this exemplary embodiment, the reset unit 25 is used to set the power flag Pf from the on ("1") state to the off ("0") state. In this way, the mode may return from the energy saving mode.

In this exemplary embodiment, the register information stored in the non-volatile main memory 30 is divided into five register information groups G. The number of register information groups may be set depending on the modes (the stop mode, the operation mode, and the energy saving mode) used.

In FIG. 3B, the same data is stored in different register information groups G so as to overlap each other. Therefore, in order to avoid the overlap between the register information items, a reference table corresponding to the modes before and after a mode change and the memory address M to be read may be designated.

In addition, the power flag Pf, the end flag Ps, the configuration status St, the identification information ID, the calendar information, the parameter, and the program counter PC stored in the non-volatile register 14 shown in FIG. 3A are an illustrative example. However, the non-volatile register 14 may include other information items or it may include plural power flags, plural end flags, plural configuration statuses, plural identification information items, plural calendar information items, plural parameters, and plural program counters.

The information processing device 1, which is a controller of the image forming apparatus 100, includes the non-volatile main memory 30, such as an MRAM which is capable of reading and writing data at a high speed and has few restrictions in the number of rewrites. Therefore, when, for example, an OS and a program are written, the information processing device 1 stores the written OS and program. Thus, when the mode is changed from the stop mode to the operation mode (case 1) and the mode is changed from the energy saving mode to the operation mode (case 4), it is not necessary to write data again. As a result, it is possible to reduce the time required to start the information processing device 1 and the image forming apparatus 100.

In addition, the information processing device 1 includes the non-volatile register 14. Therefore, when the mode is changed from the stop mode to the operation mode (case 1) and when the mode is changed from the energy saving mode to the operation mode (case 4), it is possible to resume the operation from the state immediately before the mode is changed to the stop mode or the energy saving mode.

In this exemplary embodiment, the information processing device 1 controls the image forming apparatus 100. However, the information processing device 1 may control apparatuses with other functions. In addition, for example, an ASIC including an arithmetic circuit with the same functions as those of the CPU 10 and a register may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus having an operation mode in which the image forming apparatus is supplied with power and operates, an energy saving mode in which power consumption is less than that in the operation mode, and a stop mode in which no power is supplied, comprising:
   an image forming unit that forms an image on a recording member; and
   a control unit that controls the image forming unit,
   wherein the control unit includes:
   an arithmetic unit that performs a logical operation or a numerical operation;
   a storage unit that stores a register value used by the arithmetic unit in a non-volatile register which is readable and writable, and retains stored information even when no power is supplied; and
   a change unit that changes the register value stored in the non-volatile register so as to correspond to a mode change between the operation mode and the energy saving mode or between the operation mode and the stop mode.

2. An information processing device having an operation mode in which the information processing device is supplied with power and operates, an energy saving mode in which power consumption is less than that in the operation mode, and a stop mode in which no power is supplied, comprising:
   an arithmetic unit that performs a logical operation or a numerical operation;
   a storage unit that stores a register value used by the arithmetic unit in a non-volatile register which is readable and writable, and retains stored information even when no power is supplied; and
   a first change unit that changes the register value stored in the non-volatile register so as to correspond to a mode change between the operation mode and the energy saving mode or between the operation mode and the stop mode.

3. The information processing device according to claim 2, wherein the first change unit changes the register value stored in the non-volatile register with reference to register information which is stored in an external non-volatile memory and designates a register value to be changed.

4. The information processing device according to claim 2, wherein the register value to be changed includes identification information for identifying a user.

5. The information processing device according to claim 3, wherein the register value to be changed includes identification information for identifying a user.

6. The information processing device according to claim 2, further comprising:
   a second change unit that cancels a flag for instructing a mode change from the operation mode to the energy saving mode when the mode is changed from the energy saving mode to the operation mode.

7. The information processing device according to claim 3, further comprising:
   a second change unit that cancels a flag for instructing a mode change from the operation mode to the energy saving mode when the mode is changed from the energy saving mode to the operation mode.

8. The information processing device according to claim 4, further comprising:
   a second change unit that cancels a flag for instructing a mode change from the operation mode to the energy saving mode when the mode is changed from the energy saving mode to the operation mode.

9. The information processing device according to claim 5, further comprising:
a second change unit that cancels a flag for instructing a mode change from the operation mode to the energy saving mode when the mode is changed from the energy saving mode to the operation mode.

10. The information processing device according to claim 2,
wherein the non-volatile register is any one of an MRAM, an FeRAM, a PRAM, and an ReRAM.

11. The information processing device according to claim 3,
wherein the non-volatile register is any one of an MRAM, an FeRAM, a PRAM, and an ReRAM.

12. The information processing device according to claim 4,
wherein the non-volatile register is any one of an MRAM, an FeRAM, a PRAM, and an ReRAM.

13. The information processing device according to claim 5,
wherein the non-volatile register is any one of an MRAM, an FeRAM, a PRAM, and an ReRAM.

14. The information processing device according to claim 6,
wherein the non-volatile register is any one of an MRAM, an FeRAM, a PRAM, and an ReRAM.

15. The information processing device according to claim 7,
wherein the non-volatile register is any one of an MRAM, an FeRAM, a PRAM, and an ReRAM.

16. The information processing device according to claim 8,
wherein the non-volatile register is any one of an MRAM, an FeRAM, a PRAM, and an ReRAM.

17. The information processing device according to claim 9,
wherein the non-volatile register is any one of an MRAM, an FeRAM, a PRAM, and an ReRAM.

18. A non-transitory computer readable medium storing a program that causes a computer to execute a process, the process comprising:
performing a logical operation or a numerical operation;
storing a register value used by an arithmetic unit in a non-volatile register which is readable and writable and retains stored information even when no power is supplied; and
changing a predetermined register value of the non-volatile register so as to correspond to a mode change between an operation mode in which power is supplied and an operation is performed and an energy saving mode in which power consumption is less than that in the operation mode or between the operation mode and a stop mode in which no power is supplied.

* * * * *